United States Patent [19]

Kwon

[11] Patent Number: 4,933,154
[45] Date of Patent: Jun. 12, 1990

[54] PRODUCTION OF ZRO₂ POWDER OF VERY FINE PARTICLE SIZE

[75] Inventor: Young J. Kwon, Fruit Heights, Utah

[73] Assignee: Westinghouse Electric Corp., Pittsburgh, Pa.

[21] Appl. No.: 10,514

[22] Filed: Jan. 30, 1987

[51] Int. Cl.⁵ .............................................. C01G 25/02
[52] U.S. Cl. ..................................... 423/69; 423/76; 423/77; 423/266; 423/341; 423/468; 423/492; 423/608; 501/103; 501/104
[58] Field of Search .................... 423/69, 76, 77, 341, 423/468, 492, 608, 266; 501/103, 104

[56] References Cited

U.S. PATENT DOCUMENTS 3,334,962 8/1967 Clearfield ............................ 423/608

FOREIGN PATENT DOCUMENTS 91592 7/1975 Japan ................................. 423/492
655647 7/1951 United Kingdom ................ 423/608

OTHER PUBLICATIONS

The Chemical Behavior of Zirconium, W. B. Blumenthal, D. Van Nostrand Co., N.J., 1958, pp. 106-107, 123-125.

Hackh's Chemical Dictionary, McGraw-Hill, 4th Ed., N.Y., 1969, p. 737.

Primary Examiner—Robert L. Stoll
Assistant Examiner—Paige C. Harvey
Attorney, Agent, or Firm—R. A. Stoltz

[57] ABSTRACT

A $ZrO_2$ powder of very fine particle size adapted especially for the making of high density ceramics is produced by chlorinating a zirconium source material, such as zircon sand, to produce crude $ZrCl_4$ solids; the solids are dissolved to form a $ZrOCl_2$ solution from which $ZrOCl_2$ crystals are precipitated; the crystals are dried and milled to a desired particle size; and the crystal particles are subjected to direct oxidation under controlled conditions to produce a very fine $ZrO_2$ powder especially adapted to the making of high density ceramics.

9 Claims, 1 Drawing Sheet

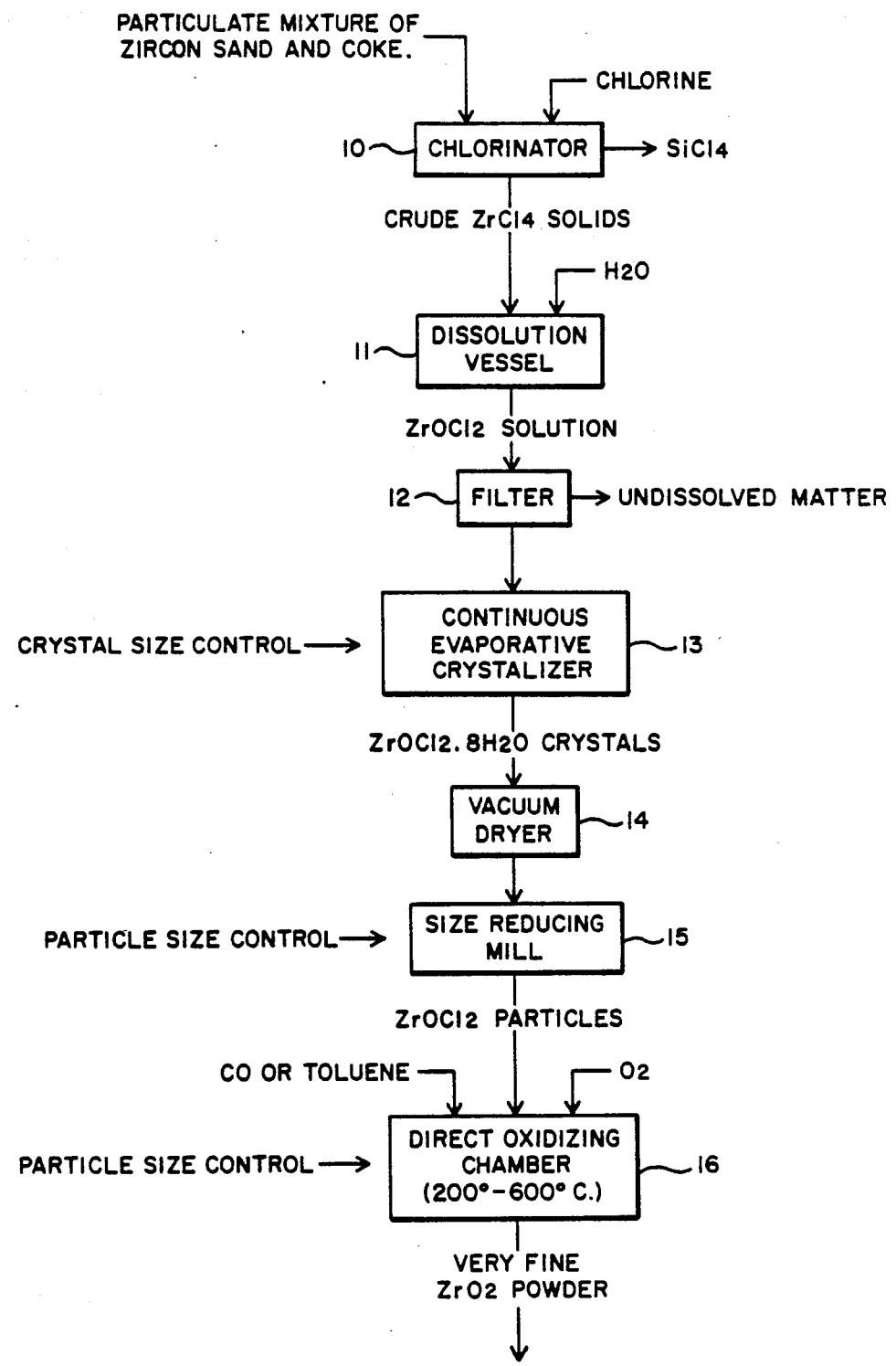

PRODUCTION OF ZRO₂ POWDER OF VERY FINE PARTICLE SIZE

BACKGROUND OF THE INVENTION

1. Field

This invention relates to the production of a zirconium oxide powder of high purity and very fine particle size which is primarily adapted for use in making high density ceramics.

2. State of the Art

Zirconium oxide powder of acceptable but not the most desirable particle size for the making of high density ceramics is conventionally produced by digesting a slurry of zirconyl chloride with an ammonia solution to yield zirconium hydroxide, which is then filtered and washed and calcined to yield the final product.

RELATED APPLICATION

In copending application Ser. No. 924,719 filed Oct. 30, 1986 now abandoned jointly by the present applicant and Thomas S. Snyder entitled "Manufacture of High Purity Zirconia by Chlorination Combined with Crystallization" there is disclosed a process whereby a zirconium source material, such as zircon sand, is processed by direct chlorination to produce an oxychloride solution containing the zirconium values from which zirconium oxychloride octahydrate is crystallized. The crystals are precipitated to provide a $ZrOCl_2\ 8H_2O$ slurry, which is filtered. The filter cake of $ZrOCl_2\ 8H_2O$ crystals is dried, milled, and calcined to produce a final $ZrO_2$ product.

SUMMARY OF THE INVENTION

In the making of the present invention, a principal object was to provide a relatively simple process by which particle size is subject to a high degree of control not heretofore possible.

In the accomplishment of this object, a zirconium source material such as $ZrSiO_4$ ore, usually zircon sand, is processed to produce zirconyl chloride ($ZrOCl_2$) crystals preferably utilizing a continuous evaporative crystalizer to control crystal size, vacuum drying of the crystals and milling them to a desired particle size, and, finally, directly oxidizing the sized $ZrOCl_2$ crystal particles within a temperature range of about 200° C. to about 600° C. and at a retention time which is controlled to yield the desired very fine particle size for the making of high density ceramics.

THE DRAWING

The single FIGURE of the drawing is a flow sheet showing the best mode presently contemplated for the carrying out of the invention in actual practice.

DETAILED DESCRIPTION OF THE ILLUSTRATED EMBODIMENT

As shown by the flow sheet of the drawing, zircon sand is subjected to chlorination in any suitable vessel 10, preferably a fluid bed chlorinator, after grinding in a ball mill with coke in accordance with the disclosure of the afore-referred-to joint application Ser. No. 924,719, now abandoned the disclosure of which application is incorporated herein by reference.

The resulting crude $ZrCl_4$ (the mixed chloride powder in Ser. No. 924,719 now abandoned) is dissolved in water in any suitable vessel 11 to produce a solution of zirconium oxychloride, which is passed through a filter 12 and run into a continuous evaporative crystallizer 13, wherein crystal size can be controlled as desired as is well known in the art. For purposes of the invention, crystal size is preferably controlled within the range of about 1 to about 50 microns.

The zirconium oxychloride crystals are preferably vacuum dried in a vacuum dryer 14 and then passed into a usual size-reducing mill 15 for controlled milling to a particle size within the range of about 0.1 to about 1 micron.

The particulate crystal material is then directly oxidized in an oxidizing chamber 16 operating at a temperature within the range of about 200° C. to about 600° C. and utilizing a clean-buring fuel, such as CO or toluene and oxygen, with controlled retention time of about one minute to about ten minutes, depending upon the temperature, to produce a $ZrO_2$ powder in the size range of about 0.1 to about 0.5 microns as a final product especially adapted to the making of high density ceramics.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A process for producing a $ZrO_2$ powder of very fine particle size for use in making high density ceramics, comprising subjecting a zirconium source material to chlorination for producing crude $ZrCl_4$ solids; dissolving said solids in a medium in which zirconium oxychloride crystals will form and from which they will precipitate; forming zirconium oxychloride crystals in and precipitating them from said medium; drying said crystals; milling the dry crystals to controlled particle size; and directly oxidizing the resulting crystal particles under controlled conditions to yield a very fine zirconium oxide powder of particle size especially adapted to the making of high density ceramics.

2. A process according to claim 1, wherein the medium in which the crude $ZrCl_4$ solids are dissolved is water and the resulting solution is filtered for the removal of undissolved matter.

3. A process according to claim 2, wherein the forming and precipitating of zirconium oxychloride is carried out in a continuous evaporative crystallizer.

4. A process according to claim 3, wherein the drying of the crystals is carried out in a vacuum dryer.

5. A process according to claim 1, wherein the milling of the dry crystals is controlled to produce particle size in the range of about 0.1 to about 1.0 microns.

6. A process according to claim 5, wherein the oxidizing of the crystal particles is controlled to yield a zirconium oxide powder of particle size within the range of about 0.1 to about 0.5 microns.

7. A process according to claim 6, wherein crystallization of zirconium oxychloride is controlled to yield crystals of size in the range of about 1.0 to about 50 microns.

8. A process according to claim 2, wherein the zirconium source material is a zircon sand.

9. A process according to claim 1, wherein the zirconium source material is a zircon sand.

* * * * *